United States Patent
Wänstedt et al.

(10) Patent No.: US 11,546,934 B2
(45) Date of Patent: Jan. 3, 2023

(54) SCHEDULING A SINGLE CELL MULTICAST TRAFFIC CHANNEL VIA A SINGLE CELL MULTICAST CONTROL CHANNEL

(71) Applicant: Telefonaktiebolaget LM Ericsson (publ), Stockholm (SE)

(72) Inventors: Stefan Wänstedt, Luleç (SE); Andreas Höglund, Solna (SE); Antti Ratilainen, Espoo (FI); Emre Yavuz, Stockholm (SE); Tuomas Tirronen, Helsinki (FI); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 84 days.

(21) Appl. No.: 16/970,212

(22) PCT Filed: Feb. 11, 2019

(86) PCT No.: PCT/SE2019/050111
§ 371 (c)(1),
(2) Date: Aug. 14, 2020

(87) PCT Pub. No.: WO2019/160476
PCT Pub. Date: Aug. 22, 2019

(65) Prior Publication Data
US 2021/0084677 A1   Mar. 18, 2021

Related U.S. Application Data

(60) Provisional application No. 62/631,459, filed on Feb. 15, 2018.

(51) Int. Cl.
*H04W 72/12* (2009.01)
*H04W 4/70* (2018.01)
(Continued)

(52) U.S. Cl.
CPC ........ *H04W 72/1289* (2013.01); *H04W 4/06* (2013.01); *H04W 4/70* (2018.02); *H04W 72/005* (2013.01)

(58) Field of Classification Search
CPC ....... H04W 4/06; H04W 4/70; H04W 72/005; H04W 72/1289
See application file for complete search history.

(56) References Cited

U.S. PATENT DOCUMENTS

2018/0131483 A1 * 5/2018 Somichetty ............ H04B 1/713
2018/0288795 A1 * 10/2018 Zhang ................... H04W 74/08
(Continued)

FOREIGN PATENT DOCUMENTS

WO   WO-2020032695 A1 *   2/2020   ............. H04L 1/189

OTHER PUBLICATIONS

EPO Communication and Search Report dated Oct. 25, 2021 for Patent Application No. 19753634.5, consisting of 8-pages.
(Continued)

*Primary Examiner* — Khaled M Kassim
*Assistant Examiner* — Kai Chang
(74) *Attorney, Agent, or Firm* — Christopher & Weisberg, P. A.

(57) ABSTRACT

A network node transmits a scheduling configuration, over a Single Cell Multicast Control Channel, that indicates whether a single transport block or multiple transport blocks of a Single Cell Multicast Traffic Channel are scheduled. The network node may then transmit a transport block in accordance with the scheduling configuration. Correspondingly, a user equipment receives the scheduling configuration. The UE may then receive a transport block in accordance with the scheduling configuration.

8 Claims, 14 Drawing Sheets

(51) Int. Cl.
*H04W 4/06* (2009.01)
*H04W 72/00* (2009.01)

(56) References Cited

U.S. PATENT DOCUMENTS

| | | | |
|---|---|---|---|
| 2019/0223197 A1* | 7/2019 | Shin | H04W 76/27 |
| 2019/0246254 A1* | 8/2019 | Chatterjee | H04L 5/0091 |
| 2019/0281418 A1* | 9/2019 | Chen | H04W 4/70 |
| 2020/0037287 A1* | 1/2020 | Zhang | H04W 72/12 |
| 2020/0059322 A1* | 2/2020 | Lei | H04L 1/08 |
| 2020/0137528 A1* | 4/2020 | Ai | H04W 4/06 |

OTHER PUBLICATIONS

3GPP TSG RAN WG1 Meeting #88bis R1-1706780; Title: RAN1 agreements for Rel-14 FeMTC; Agenda Item: 7.1.5; Source: Ericsson; Document for: Information; Date and Location: Apr. 3-7, 2017, Spokane, USA, consisting of 14-pages.

3GPP TSG RAN WG1 Meeting #91 R1-1719720; Title: Considerations on physical layer aspects on SPS in NB-IoT Agenda Item: 6.2.6.4; Source: ZTE, Sanechips; Document for: Discussion and Decision; Date and Location: Nov. 27-Dec. 1, 2017, Reno, USA, consisting of 3-pages.

International Search Report dated Apr. 24, 2019 for International Application No. PCT/SE2019/050111 filed on Feb. 11, 2019, consisting of 13-pages.

RI-1701858; 3GPP TSG RAN WG1 Meeting #88; Title: SC-PTM support of SPS; Agenda Item: 7.2.3.2; Source: Nokia, Alcatel-Lucent Shanghai Bell; Document for: Discussion and Decision; Date and Location: Feb. 13-17, 2017, Athens, Greece; consisting of 6-pages.

RI-1701863; 3GPP TSG RAN WG1 Meeting #88; Title: Remaining Issues for SC-PTM; Agenda Item: 7.2.4.2; Source: Nokia, Alcatel-Lucent Shanghai Bell; Document for: Discussion and Decision; Date and Location: Feb. 13-17, 2017, Athens, Greece; consisting of 4-pages.

RI-1713791; 3GPP TSG RAN WG1 Meeting #90 ; Title: Support for semi-persistent scheduling in NB-IoT; Agenda Item: 5.2.7.1.3; Source: Nokia, Nokia Shanghai Bell; Document for: Discussion and Decision; Date and Location: Aug. 21-25, 2017, Prague, Czech Republic; consisting of 3-pages.

R2-1712330; 3GPP TSG RAN WG2 Meeting #100 ; Title: Consideration on SPS for SC-PTM in FeNB-IoT; Agenda Item: 9.13.5; Source: ZTE; Document for: Discussion and Decision; Date and Location: Nov. 27-Dec. 1, 2017, Reno Nevada, USA; consisting of 5-pages.

R2-1803694; 3GPP TSG RAN WG2 Meeting #101 ; Title: Introducing SPS for NB-IoT SC-PtM; Agenda Item: 9.13.5; Source: Ericsson; Document for: Discussion, Decision; Date and Location: Feb. 26-Mar. 2, 2018, Athens Greece; consisting of 4-pages.

* cited by examiner

TRANSMIT A SIGNAL TO THE UE102 OVER AN SC-MCCH, THE SIGNAL INDICATING AN ACTIVATION OR DEACTIVATION OF SPS, AND/OR PARAMETERS OF SPS, FOR AN SC-PTM SERVICE
202

RECEIVING, AT THE UE AND FROM A NETWORK NODE, A SIGNAL OVER AN SC-MCCH, THE SIGNAL INDICATING AN ACTIVATION OR DEACTIVATION OF SPS, AND/OR PARAMETERS OF SPS, FOR AN SC-PTM SERVICE
302

SCHEDULING A SINGLE CELL MULTICAST TRAFFIC CHANNEL VIA A SINGLE CELL MULTICAST CONTROL CHANNEL

CROSS-REFERENCE TO RELATED APPLICATIONS

This application is a Submission Under 35 U.S.C. § 371 for U.S. National Stage Patent Application of International Application No.: PCT/SE2019/050111, filed Feb. 11, 2019 entitled "SCHEDULING A SINGLE CELL MULTICAST TRAFFIC CHANNEL VIA A SINGLE CELL MULTICAST CONTROL CHANNEL," which claims priority to U.S. Provisional Application No. 62/631,459, filed Feb. 15, 2018, the entireties of both of which are incorporated herein by reference.

RELATED APPLICATIONS

This application claims priority to U.S. Provisional Patent Application Ser. No. 62/631,459, filed 15 Feb. 2018, the entire contents of which are incorporated by reference herein.

TECHNICAL FIELD

The present disclosure generally relates to the field of wireless communication networks, and more particularly relates to transmission scheduling in such networks.

BACKGROUND

In the field of wireless communications, typically a network node specifies to connected devices which time and/or frequency resources of the downlink will be used to transmit data, and which time and/or frequency resources of the uplink are allocated for the device to transmit on the uplink. In this way, the time and/or frequency resources of the air interface are well managed, collisions are avoided, devices need not attempt to decode resources in which transmissions are not scheduled, and other efficiencies are realized.

Traditionally, scheduling of the uplink and/or downlink is performed dynamically. Dynamic scheduling of the uplink and/or downlink refers to scheduling in which a schedule is provided for each transmission opportunity (e.g., a schedule of the resources of a subframe is provided for at least every subframe in which a transmission will occur).

An alternative to dynamic scheduling is Semi-Persistent Scheduling (SPS). SPS allows for a single schedule to be applied to multiple transmission opportunities. For example, an SPS scheme may provide an uplink and/or downlink schedule, and that schedule of resources is to be used for each subsequent transmission opportunity, until further notice (e.g., cancellation of SPS scheduling or modification of the schedule). This often reduces signaling overhead between the network node and connected devices because the transmission of scheduling information generally does not need to be provided as frequently.

In legacy releases of Long Term Evolution (LTE), SPS is connected to a bearer with certain characteristics. This simplifies both configuration and activation of a service scheduled with SPS. When there is traffic on the configured bearer, SPS can be triggered in the scheduling information. In Narrowband Internet of Things (NB-IoT), many of the characteristics of Legacy LTE are missing. Accordingly, SPS in NB-IOT cannot rely on such missing characteristics.

Techniques for configuring SPS in NB-IoT and other next generation radio technologies are not presently known or available. Discussed herein, among other things, are example embodiments that provide techniques for configuring (e.g., activating, deactivating, modifying) SPS in NB-IoT, and which may also be useful in other next generation radio technologies.

SUMMARY

Embodiments of the present disclosure are directed to scheduling a Single Cell Multicast Traffic Channel (SC-MTCH) via a Single Cell Multicast Control Channel (SC-MCCH). In particular, a scheduling configuration is transmitted over the SC-MCCH that indicates whether a single transport block or multiple transport blocks of an SC-MTCH are scheduled. According to embodiments, the scheduling configuration is transmitted from a network node to a UE. The UE may then use the scheduling configuration to determine how many transport blocks to expect the network node to transmit on the SC-MTCH.

Particular embodiments of the present disclosure include a method performed by a UE. The method comprises receiving a scheduling configuration, over an SC-MCCH. The scheduling configuration indicates whether a single transport block or multiple transport blocks of an SC-MTCH are scheduled.

In some embodiments, to indicate that multiple transport blocks are scheduled, the scheduling configuration comprises a value explicitly specifying how many transport blocks are comprised in the multiple transport blocks. In other embodiments, the scheduling configuration does not explicitly specify how many transport blocks are scheduled, and the method further comprises interpreting the scheduling configuration as indicating that a preconfigured number of transport blocks are scheduled.

In some embodiments, the method further comprises monitoring the SC-MCCH for the scheduling configuration, and in response to receiving the scheduling configuration, suspending the monitoring until all of the scheduled transport blocks are received. The method further comprises resuming the monitoring in response to receiving all of the scheduled transport blocks. In some such embodiments, the method further comprises failing to receive a further scheduling configuration within a threshold period after the monitoring is resumed, and in response, re-suspending the monitoring until additional transport blocks equal to the scheduled transport blocks in number are received. In other such embodiments, the method further comprises failing to receive a further scheduling configuration within a threshold period after the monitoring is resumed, and in response, re-suspending the monitoring until a preconfigured number of additional transport blocks are received, irrespective of how many transport blocks are indicated by the scheduling configuration as being scheduled.

In some embodiments, receiving the scheduling configuration comprises receiving the scheduling configuration during a modification period of a plurality of successive modification periods, and the method further comprises refraining from adopting the scheduling configuration until the modification period has elapsed and the next successive modification period after the modification period has commenced.

In some embodiments, the scheduling configuration further indicates a change to a semi-persistent scheduling (SPS) configuration of the SC-MTCH. In some such embodiments, the change to the SPS configuration comprises activation of SPS. In other such embodiments, the change to the SPS configuration comprises a pause of SPS. In either of such embodiments, the change to the SPS configuration may comprise a modification of SPS parameters of the SPS configuration. In yet other such embodiments, the change to the SPS configuration comprises deactivation of SPS. In at least some of these embodiments, the change to the SPS configuration does not include any indication of enabling dynamic scheduling. In some other embodiments, the method further comprises, responsive to the change to the SPS configuration comprising deactivation of SPS, monitoring for downlink control information that dynamically schedules the SC-MTCH.

Correspondingly, other embodiments of the present disclosure include a method performed by a network node. The method comprises transmitting a scheduling configuration, over an SC-MCCH. The scheduling configuration indicates whether a single transport block or multiple transport blocks of an SC-MTCH are scheduled.

In some embodiments, to indicate that multiple transport blocks are scheduled, the scheduling configuration comprises a value explicitly specifying how many transport blocks are comprised in the multiple transport blocks. In other embodiments, the method further comprises indicating that a preconfigured number of transport blocks are scheduled by refraining from explicitly specifying in the scheduling configuration how many transport blocks are scheduled.

In some embodiments, the method further comprises transmitting the scheduled transport blocks in accordance with the scheduling configuration. In some such embodiments, the method further comprises refraining from transmitting a further scheduling configuration within a threshold period after having transmitted the scheduled transport blocks, and in response, transmitting additional transport blocks equal to the scheduled transport blocks in number in accordance with the scheduling configuration. In other of such embodiments, the method further comprises refraining from transmitting a further scheduling configuration within a threshold period after having transmitted the scheduled transport blocks, and in response, transmitting a preconfigured number of additional transport blocks, irrespective of how many transport blocks are indicated by the scheduling configuration.

In some embodiments, transmitting the scheduling configuration comprises transmitting the scheduling configuration during a modification period of a plurality of successive modification periods, and the scheduled single transport block or multiple transport blocks are scheduled to be transmitted in the next successive modification period after the modification period.

In some embodiments, the scheduling configuration further indicates a change to a semi-persistent scheduling (SPS) configuration of the SC-MTCH. In some such embodiments, the change to the SPS configuration comprises activation of SPS. In other of such embodiments, the change to the SPS configuration comprises a pause of SPS. In either of such embodiments, the change to the SPS configuration may comprise a modification of SPS parameters of the SPS configuration. In yet other embodiments, the change to the SPS configuration comprises deactivation of SPS. In at least some of these embodiments, the change to the SPS configuration does not include any indication of enabling dynamic scheduling. On other of these embodiments, the method further comprises, responsive to the change to the SPS configuration comprising deactivation of SPS, transmitting downlink control information that dynamically schedules the SC-MTCH.

Yet other embodiments include a UE configured to receive a scheduling configuration, over an SC-MCCH, that indicates whether a single transport block or multiple transport blocks of an SC-MTCH are scheduled.

In some embodiments, the method further comprises a processor and a memory, the memory containing instructions executable by the processor whereby the UE is so configured.

In some embodiments, the UE is further configured to perform any of the UE methods described above.

Yet other embodiments include a network node configured to transmit a scheduling configuration, over an SC-MCCH, that indicates whether a single transport block or multiple transport blocks of an SC-MTCH are scheduled.

In some embodiments, the network node comprises a processor and a memory, the memory containing instructions executable by the processor whereby the network node is so configured.

In some embodiments, the network node is further configured to perform any of the network node methods described above.

Yet other embodiments include a computer program, comprising instructions which, when executed on at least one processor of a device, cause the at least one processor to carry out any of the methods described above.

Yet other embodiments include a carrier containing such a computer program. The carrier is one of an electronic signal, optical signal, radio signal, or computer readable storage medium. In some such embodiments, the carrier is a non-transitory computer readable storage medium.

BRIEF DESCRIPTION OF THE FIGURES

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a modification period 13, generally, as opposed to discussion of particular instances of modification periods 13a, 13b).

DETAILED DESCRIPTION

Figure 1:
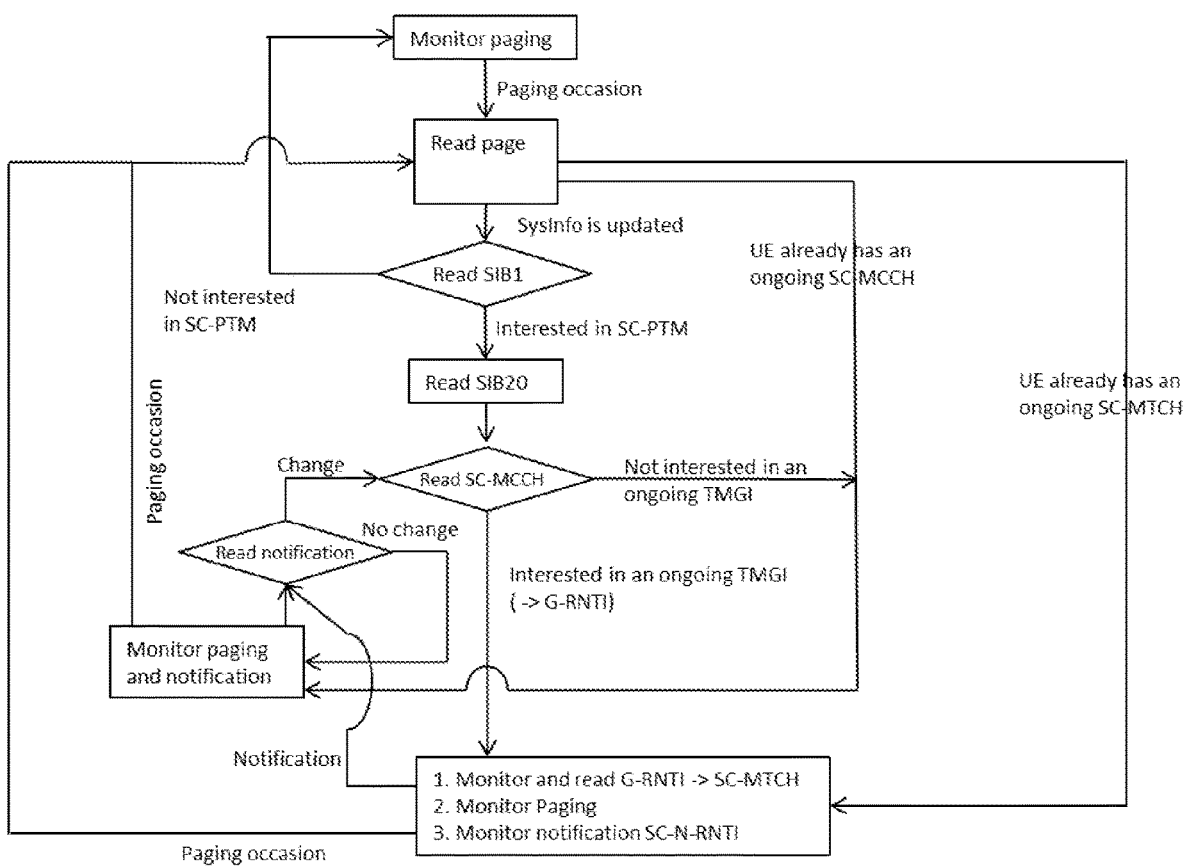
FIG. 1 is a flow diagram illustrating an example process by which a device in idle mode may acquire information needed to receive Single Cell Point-to-Multipoint (SC-PTM) transmissions, according to one or more embodiments of the present disclosure.

Since Third Generation Partnership Project (3GPP) Rel-13 there has been support for a relatively new radio interface called Narrowband IoT (NB-IoT) and corresponding device category NB1 (Cat-NB1). An objective of NB-IoT is to specify radio access for cellular internet of things that addresses improved indoor coverage, support for massive number of low throughput devices, low delay sensitivity, ultra-low device cost, low device power consumption and/or (optimized) network architecture.

NB-IoT defines stand-alone, guard-band, and in-band operation modes. In stand-alone mode, the NB-IoT system is operated in dedicated frequency bands. For in-band operation, the NB-IoT system can be placed inside the frequency bands used by the current Long Term Evolution (LTE) system, while in the guard-band mode, the NB-IoT system can be operated in the guard band used by the current LTE system. The NB-IoT can operate with a system bandwidth of 180 kHz. When multi-Physical Resource Block (multi-PRB) is configured, several 180 kHz PRBs can be used, e.g., for increasing the system capacity, inter-cell interference coordination, and/or load balancing. In the releases succeeding Rel-13, some additions to NB-IoT have been specified (mostly to increase the "capacity", such as use of an additional carrier (multi-PRB) to increase bit rate, and/or various improvements to further improve power consumption). During multi-PRB operations the NB-IoT device listens to the system information on the anchor PRB, but when there is data, the communication can be moved to a secondary PRB.

One improvement that was specified in Rel-14 was support for broadcast transmissions. Broadcast may be useful when a large number of devices need firmware updates. In Rel-15, there are proposals on how to further improve efficiency of broadcast transmissions for NB-IoT.

There is a need to investigate if semi-persistent scheduling (SPS) in the uplink (UL) and/or downlink (DL) can help reduce power consumption and latency for NB-IoT in Rel-15. SPS can be used together with the broadcast service, e.g., Single Cell Point-to-Multipoint (SC-PTM) to achieve better energy and network resource savings.

It should be noted that although the present disclosure mostly discusses NB-IoT, the supported features are similar on a general level with those in LTE category M1 (LTE-M) Bandwidth reduced Low Complexity/Coverage Enhancement (BL/CE).

There are multiple differences between "legacy" LTE and the procedures and channels defined for NB-IoT. The differences include a new physical downlink control channel, called Narrowband Physical Downlink Control Channel (NPDCCH) used in NB-IoT.

In the LTE specifications multicast and broadcast services have been specified under Multimedia Broadcast Multicast Services (MBMS) enabling transmission of the same content to multiple UEs (in a specified area) at the same time.

As of Rel-14 NB-IoT (Cat-NB1) and LTE-M (Cat-M1) devices support MBMS, as multicast support is advantageous for many IoT use cases. Example use cases may include transmission of a firmware update to a large number of devices or sending a command to a large number of actuators (i.e., type of device) at the same time. Alternatives include transmitting such transmissions/commands to each receiving device separately using unicast transmissions. Using multicast to transmit the same transmission/command to a large number of devices with a single transmission generally reduces the time needed to deliver the message and the radio resources required, thus increasing spectral efficiency. The multicast services can be realized using two different transmissions schemes, MBMS Single-Frequency Network (MBSFN) and SC-PTM.

SC-PTM can be used to provide singe-cell transmission of MBMS sessions. Scheduling of the transmission is done by the eNodeB (eNB). Two logical channels, SC-MCCH and SC-MTCH, are defined for transportation of SC-PTM control information as well as the actual multicast traffic. There is no retransmission support for the multicast packets in Media Access Control (MAC) or Radio Link Control (RLC) (RLC Unacknowledged Mode (UM) is used), thus the transmissions consist of only a single transmission on the Downlink Shared Channel (DL-SCH) from the eNB. Thus, all traffic is eventually transmitted over the Physical Downlink Shared Channel (PDSCH) with the necessary Downlink Control Information (DCI) on the downlink control channel.

A Multi-cell/multicast Coordination Entity (MCE) is the logical entity in Evolved Universal Mobile Telecommunications Service (UMTS) Terrestrial Radio Access Network (E-UTRAN) that decides whether to use SC-PTM or MBSFN. For enhanced Machine-Type Communication (eMTC) and NB-IoT, MCE should always select SC-PTM for multicast operation.

As a pre-requisite for a device to receive an MBMS service, the device needs a User Service Description (USD), which can be obtained during user service discovery. The USD contains information such as frequencies and service areas where the service is available, Temporary Mobile Group Identity (TMGI) of service, and start and stop time of a service. When the device recognizes a frequency and the service area is indicated in System Information Block (SIB) 15 (SIB15), the device starts to listen for available MBMS services on that particular frequency.

SC-MCCH is used to transmit the control information related to SC-PTM transmissions. The SCPTMConfiguration message consists of the SC-MTCH-InfoList Information Elements (IEs) which give information about the ongoing MBMS sessions, configures the scheduling parameters (Discontinuous Reception (DRX) and scheduling frequency) for SC-MTCH and provides TMGI (used to identify MBMS bearer and service) to Global System for Mobile communciations (GSM) Enhanced Data rates for GSM Evolution (EDGE) Radio Access Network (GERAN) Radio Network Temporary Identifier (G-RNTI) mapping for each of the sessions.

FIG. 1 provides an overview of the control information and data transmission flow for a device in idle mode. In particular, FIG. 1 illustrates an example process by which a device in idle mode may acquire information needed to receive SC-PTM transmissions on SC-MTCH. Before reading SC-MCCH, the device needs to acquire SIB20, which contains the SC-MCCH scheduling information. One SC-MCCH per cell is transmitted periodically by Radio Resource Control (RRC) based on a configurable repetition period. This configuration is given in SIB20.

Figure 2:
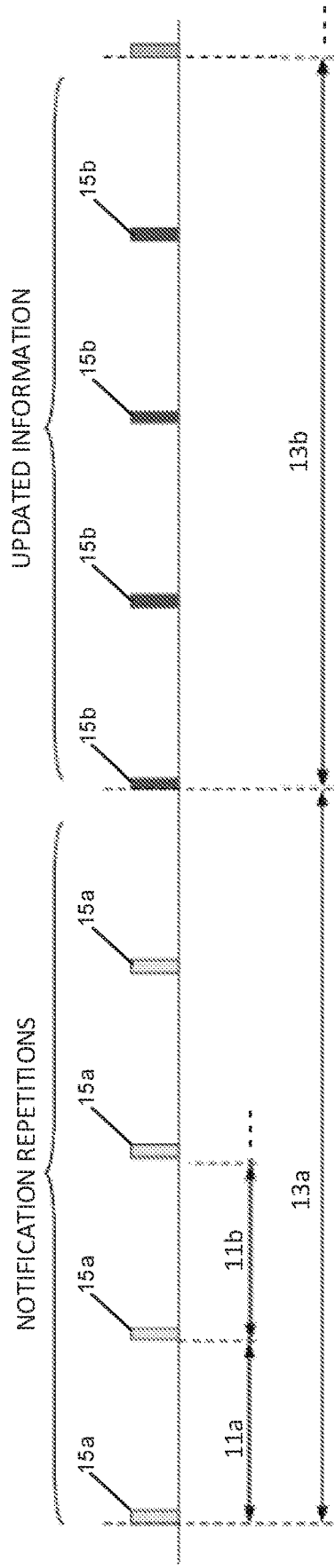
FIG. 2 is a schematic block diagram illustrating an example in which a transmission is repeatedly transmitted in each repetition period until the end of a modification period, according to one or more embodiments of the present disclosure.

For SC-MCCH change, a modification period concept similar to system information, is used. This means that change of SC-MCCH can occur only on the modification period boundaries, and the boundaries are defined by Single Frequency Network (SFN) mod m=0, where m is the length of the modification period. FIG. 2 illustrates an example in which transmission 15a is repeatedly transmitted in each repetition period 11 (i.e., repetition period 11a, then 11b, and so on) until the end of the modification period 13a, and the change of SC-MCCH occurs at the boundary between modification period 13a and modification period 13b.

Thus, a repetition period 13 (sc-mcch-RepetitionPeriod in SIB20) defines the frequency of SC-MCCH transmissions in radio frames. Additionally, an offset in radio frames and starting subframe of possible SC-MCCH is indicated and optionally the length of the SC-MCCH period (e.g., sc-mcch-duration, indicating the number of consecutive subframes where SC-MCCH may be scheduled). SC-MCCH change is indicated using a notification mechanism. In particular, a notification is sent using Single Cell Notification RNTI (SC-N-RNTI) using DCI Format 1C in the first subframe which can be used for SC-MCCH in the repetition period 11. An example of such a notification is transmission 15a shown in FIG. 2.

After the device receives the notification, the device starts acquiring SC-MCCH from the same subframe where the notification was received, and applies any changes reflected therein to the following modification period 13. In this example, the notification 15a notifies the device in repetition period 11a that the SC-MCCH indicates a change during modification period 13a. The device begins receiving the SC-MCCH during repetition period 11a, and the device applies that change indicated in the SC-MCCH in modification period 13b, e.g., in order to decode transmission 15b.

Additionally, when the device enters a cell broadcasting SIB20, the device starts acquiring SC-MCCH in the next repetition period 11. Also, if the device is receiving a MBMS service, it will acquire SC-MCCH in the beginning of each modification period 13. SC-MCCH transmissions are indicated using SC-RNTI.

The device uses the Single Cell Multicast Radio Bearer (SC-MRB) establishment procedure whenever it is interested to receive an MBMS transmission. This bearer is transmitted on SC-MTCH and the establishment procedure configures RLC, MAC and physical layers to receive SC-PTM transmissions. The acquired SCPTMConfiguration message contains the scheduling and DRX parameters, where onDurationTimerSCPTM gives the number of subframes the device is expected to stay awake per one scheduling instant and drx-InactivityTimerSCPTM gives the number of subframes the device stays active when a DL transmission is indicated on Physical Downlink Control Channel (PDCCH). In addition, schedulingPeriodStartOffsetSCPTM gives both the scheduling periodicity for the data transmission and offset in subframes.

For the data transmission the device monitors PDCCH for G-RNTI when either of the timers onDurationTimerSCPTM or drx-InactivityTimerSCPTM is running. SC-MCCH and SC-MTCH transmission cannot be multiplexed into the same MAC Protocol Data Unit (PDU).

It should be noted that the SC-MRB setup procedure and data transmission (thus also SC-MCCH information acquisition) can be used in both RRC_IDLE and RRC_CONNECTED modes.

Figure 3:
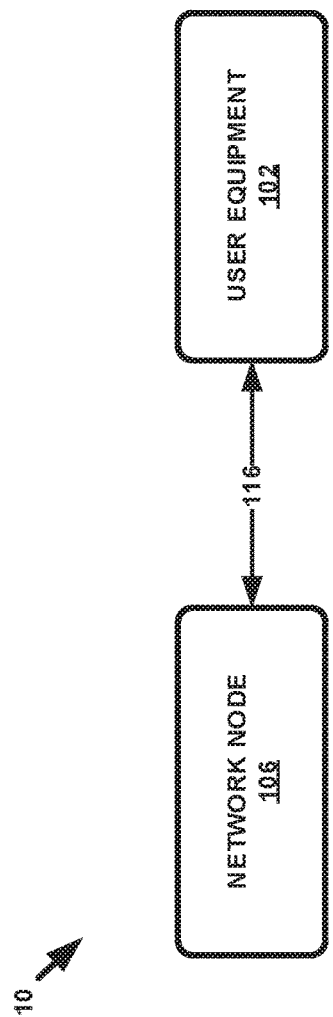
FIG. 3 is a schematic block diagram of an example wireless communications network, according to one or more embodiments of the present disclosure.

The present disclosure describes various example embodiments that may be implemented in a UE and/or network node (e.g., base station) such as the UE 102 and network node 106 of the wireless communications network 10 illustrated in FIG. 3. In an aspect, the UE 102 and network node 106 can communicate application/user data and/or control data over one or more channels 116 (e.g. SC-MCCH, SC-PTM). At least one of said embodiments is useful for configuring (e.g., activating, deactivating, modifying) SPS in NB-IoT (e.g., in embodiments of the network 10 in which all services over the channel(s) 116 are over the same bearer).

In this communication shown in FIG. 3, SC-PTM can be employed, and the available services are broadcasted over the SC-MCCH channel. Hence, in an aspect of the present disclosure, information related to such services is used to activate and deactivate SPS. Since a device must read SC-MCCH at every modification period in certain embodiments, such embodiments are fairly robust and the risk of misdetection is low. With such a solution, activation of SPS may be possible with a minimum of changes to 3GPP specifications.

It should be appreciated that in the discussion below, the term "receive multiple DL allocations" or similar is used. Due to the multicast nature, there are generally no retransmissions, thus there is a chance that the received information is not correct. Therefore, receive in the context of this disclosure means the UE 102 receives the signal "as scheduled by the network" without any indication, implied or otherwise, as to whether the signal is correctly received.

According to embodiments, the SPS service for SC-PTM is activated using SC-MCCH, and each UE 102 monitors this channel at least once every modification period 11. The SC-MCCH is repeated every repetition period 13. When SC-MCCH is changed, the changed SC-MCCH is transmitted initially in the beginning of the following modification period 11.

If the UE 102 detects a change in SC-MCCH stating a new configuration (including SPS) is available, the UE 102 will know that the incoming service is, for example, a firmware update and prepares to activate SPS reception when the next modification period 11 starts. Similarly, SPS can be deactivated with the same or similar mechanism.

Due to activation using SC-MCCH, as compared to using dynamic activation via SPS-C-RNTI, a parameter indicating when the SPS transmission is started can be included in SC-MCCH. This can either be relative in time to the SC-MCCH transmission or defining the start position in absolute terms. Deactivation can be done similarly. Inactivation/deactivation can also be done implicitly, e.g., if SPS has been earlier configured for a particular multicast service via SC-MCCH, SPS can be considered to be activated in the next modification cycle when the service starts, then in one embodiment the parameter indicating SPS transmission start is not explicitly included, and the SPS activation can be considered persistent until SPS is explicitly stopped.

Figure 4:
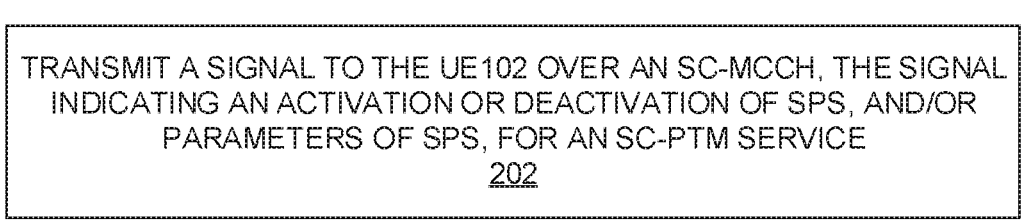
FIGS. 4 and 7 are flow diagrams illustrating respective example methods implemented by a network node, according to one or more embodiments of the present disclosure.
Figure 5:
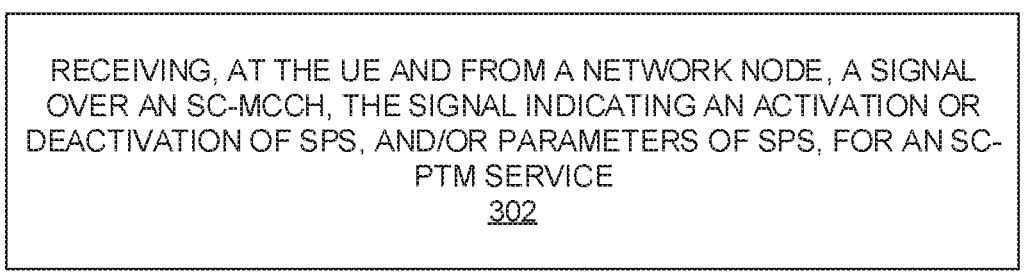
FIGS. 5 and 6 are flow diagrams illustrating respective example methods implemented by a user equipment, according to one or more embodiments of the present disclosure.

Turning to FIGS. 4 and 5, example methods 200 and 300 are presented, which can be performed by network node 106 and/or UE 102 of FIG. 3, respectively. For instance, in FIG. 4, a method 200 performed by a network node 106 is shown. According to an aspect, the method 200 includes transmitting a signal to the UE 102 over an SC-MCCH, the signal indicating an activation or deactivation of SPS, and/or parameters of SPS, for an SC-PTM service (block 202). Thus, embodiments include the activation or deactivation of SPS for an SC-PTM service being indicated in the SC-MCCH.

Likewise, in FIG. 5, a method 300 is shown that can be performed by a UE 102. According to an aspect, the method 300 includes receiving, at the UE 102 and from a network node 106, a signal over an SC-MCCH, the signal indicating an activation or deactivation of SPS, and/or parameters of SPS, for an SC-PTM service (block 302).

In addition to these aspects of methods 200 and 300, the following aspects are non-limiting features that can be performed according to one or both of these methods 200 and/or 300.

In some embodiments, the change of SPS and corresponding parameters for an SC-PTM service is indicated in the SC-MCCH.

If SC-PTM is configured with SPS, then intended UEs 102 should first obtain the configurations of the SC-PTM service in the SC-MCCH, and according to the configuration to start to listen to the SC-MTCH that carries the services. In order to maintain flexibility, the SPS service can be paused or deactivated by the network, e.g., in cases where there are not enough DL resources.

In some embodiments, the network node 106 can pause the SPS transmission and change to dynamic scheduling of the SC-MTCH. The network node 106 can indicate this to the UE 102 via, e.g., DCI (e.g., as described in embodiments further below).

In some embodiments, a UE 102 monitors for DCI or SC-MCCH messages at given locations while following an ongoing SPS session of a given SC-MTCH. If the DCI or the SC-MCCH message indicates that the SPS is deactivated, the UE 102 would assume the SC-MTCH is scheduled in a dynamic way and monitors the search space that carriers the DCI that schedules the SC-MTCH.

In some embodiments, a UE 102 monitors for DCI or SC-MCCH messages at given locations while following an ongoing SPS session of a given SC-MTCH. If the DCI or the SC-MCCH message indicates that the SPS is deactivated and there are no parameters of enabling SC-MTCH dynamic scheduling, the UE 102 reads the SC-MCCH in the next modification period about the configurations of the SC-MTCH it intends to receive.

In some embodiments, a UE 102 monitors for DCI or SC-MCCH messages at given locations while following an ongoing SPS session of a given SC-MTCH. If the DCI or the SC-MCCH message indicates that SPS is deactivated or changed in the next modification period 13, the UE 102 reads the SC-MCCH in the next modification period 13 about the configurations of the SC-MTCH it intends to receive.

In some embodiments, if a UE 102 is receiving SC-MTCH configured with SPS, the UE 102 checks the DCI that schedules SC-MCCH in each modification period 13 to see whether there is a change of the SC-MTCH it is receiving. In one such embodiment, the DCI itself includes information, such as SPS pause, activation or deactivation mapped to a specific multicast service or SC-MTCH. In an alternative embodiment, the UE 102 reads the SC-MCCH to get the information.

In some embodiments, if a UE 102 is receiving SC-MTCH configured with SPS, the UE 102 checks a special DCI (different than the one schedules the SC-MCCH) in each modification period 13 to see whether there is a change of the SC-MTCH it is receiving. In one embodiment, this special DCI could be a new DCI format defined specifically for this purpose.

As noted above, in contrast to single point to single point transmission, there is no retransmission or acknowledgement in SC-PTM transmission. Thus, example embodiments as discussed below are envisioned.

In some embodiments, a UE 102 is configured to receive multiple DL zgrants that schedules several transport blocks of SC-MTCH. The number of DL grants may be indicated in the DCI or in SC-MCCH.

In some embodiments, a default number of DL grants for a SC-MTCH is configured by the SC-MCCH. The UE 102 assumes this default number until there is a DCI that indicates otherwise.

In some embodiments, a DCI indicates multiple DL grants to schedule the SC-MTCH.

In some embodiments, a UE 102 does not expect the network to send another DCI until the UE 102 finishes receiving all the previous scheduled DL grants, e.g., the default setting or the number indicated in the previous DCI.

In some embodiments, after receiving all previously scheduled DL grants, if there is no new DCI, the UE 102 assumes the configuration of the previous DCI is still valid, and monitors a new DCI again after it receives the all the scheduled DL grants. When there is a new DCI with new information the UE 102 behaves according to the new DCI.

In some embodiments, after receiving all previously scheduled DL grants, if there is no new DCI, the UE 102 returns to monitoring the default number of grants, monitors for a new DCI again after it receives the all the default number scheduled DL grants.

In some embodiments, for the multi-grant case, DCI is used for the deactivation at least.

In some embodiments, a device configured to use multi-grant monitors at least one DCI per N grants. So, if the network needs to recall the SPS resources, the DCI can be used to deactivate the SPS multi-grant. After deactivation the device either goes back to the default behavior, (e.g., dynamic scheduling) and the SPS can be activated again by using DCI or change notification, or simply stops and checks the MCCH in the next modification period 13.

Figure 6:
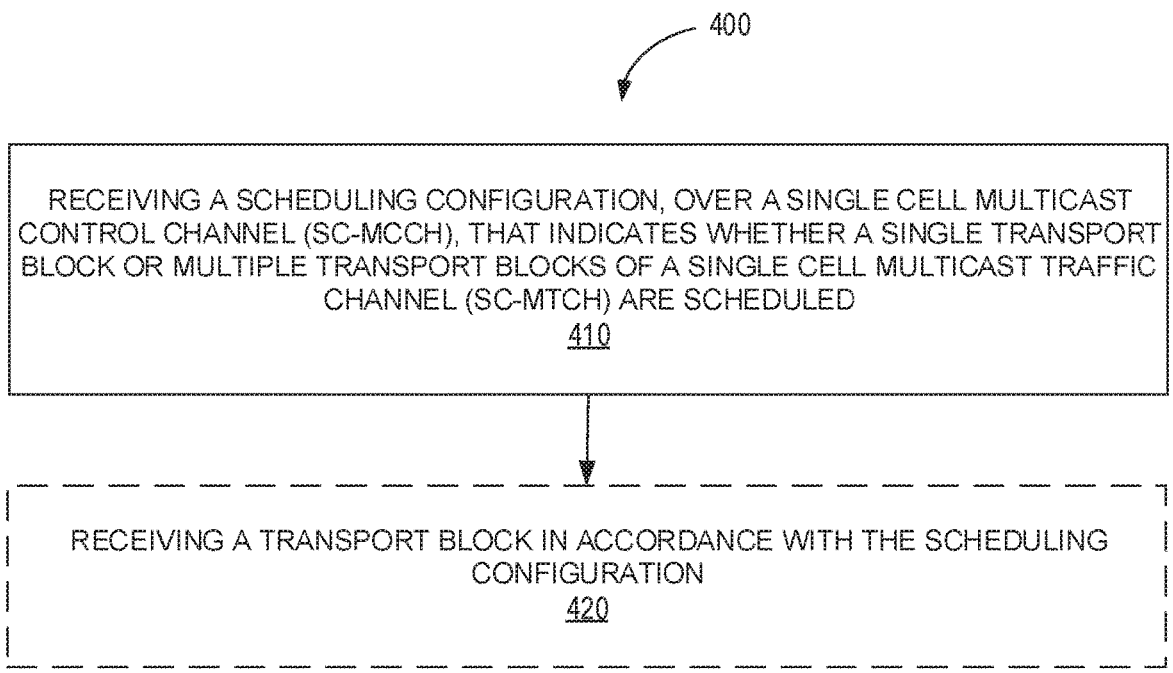

In view of the above, FIG. 6 illustrates a method 400 implemented by a UE 102, in accordance with one or more embodiments of the present disclosure. The method 400 receiving a scheduling configuration, over an SC-MCCH, that indicates whether a single transport block or multiple transport blocks of an SC-MTCH are scheduled (block 410). In some embodiments, the method 400 further comprises receiving a transport block in accordance with the scheduling configuration (block 420).

Figure 7:
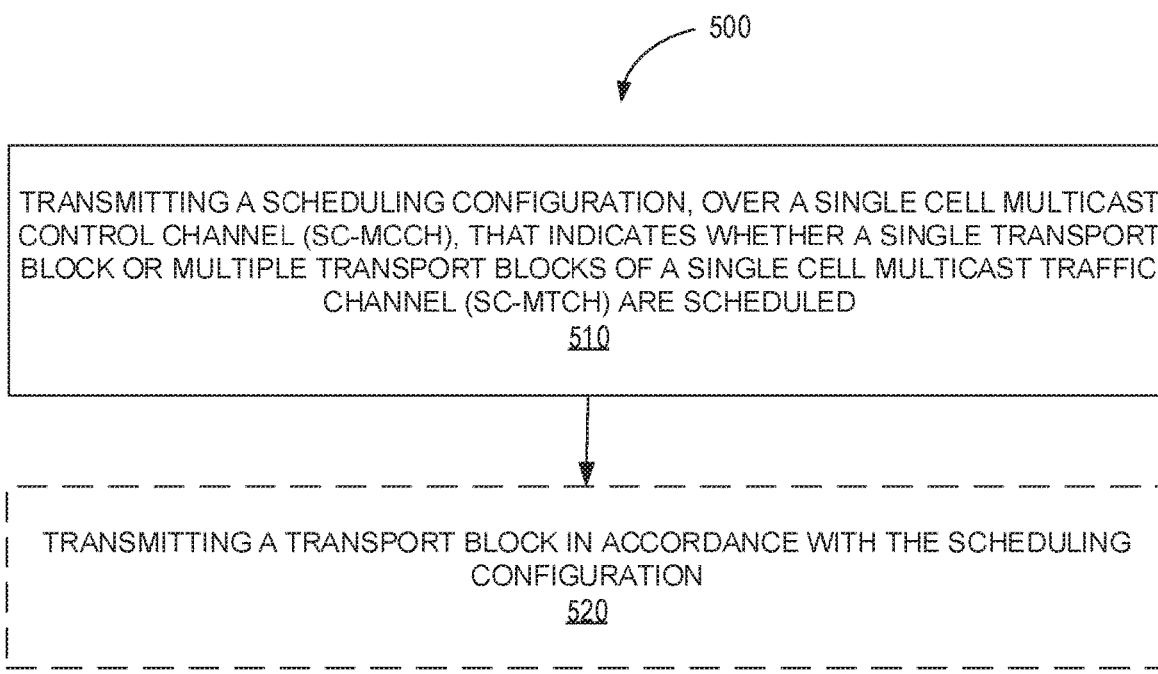

Correspondingly, FIG. 7 illustrates a method 500 implemented by a network node 106, in accordance with one or more embodiments of the present disclosure. The method 500 comprises transmitting a scheduling configuration, over an SC-MCCH, that indicates whether a single transport block or multiple transport blocks of an SC-MTCH are scheduled (block 510). In some embodiments, the method 500 further comprises transmitting a transport block in accordance with the scheduling configuration (block 520).

Figure 8:
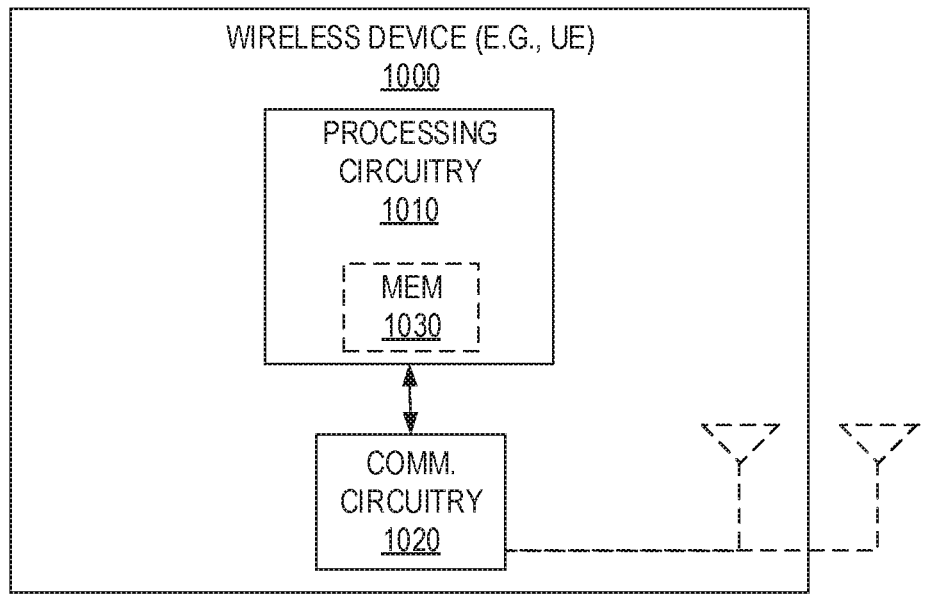
FIG. 8 is a schematic block diagram illustrating an example wireless device (e.g., a user equipment), according to one or more embodiments of the present disclosure.

FIG. 8, for example, illustrates a wireless device 1000 (e.g., UE 102) as implemented in accordance with one or more embodiments. As shown, the wireless device 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless device 1000. The processing circuitry 1010 is configured to perform processing described above, such as by executing instructions stored in memory 1030. The processing circuitry 1010 in this regard may implement certain functional means, units, or modules, e.g., comprised in the processing circuitry 1010 and/or via software code stored in the memory 1030.

Figure 9:
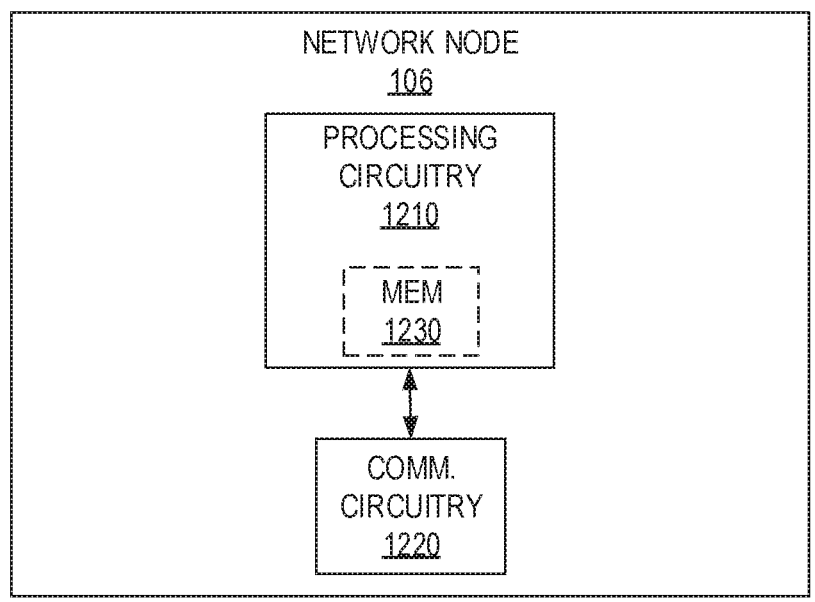
FIG. 9 is a schematic block diagram illustrating an example network node, according to one or more embodiments of the present disclosure.

FIG. 9 illustrates a network node 106 as implemented in accordance with one or more embodiments. As shown, the network node 106 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above, such as by executing instructions stored in memory 1230. The processing circuitry 1210 in this regard may implement certain functional means, units, or modules, e.g., comprised in the processing circuitry 1210 and/or via software code stored in the memory 1230.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 10:
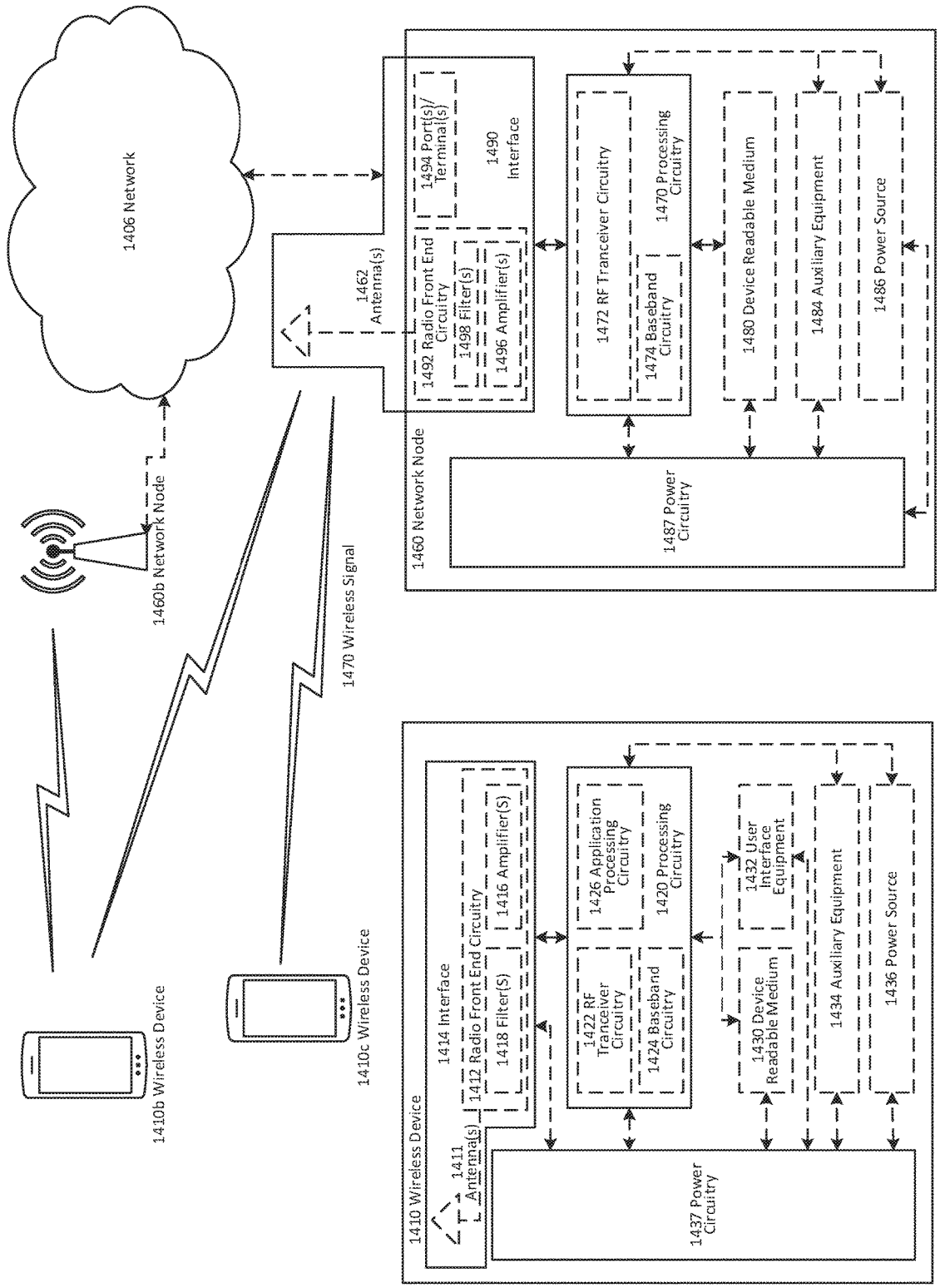
FIG. 10 is a schematic block diagram illustrating an example wireless network, according to one or more embodiments of the present disclosure.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1406, network nodes 1460 and 1460b, and WDs 1410, 1410b, and 1410c. In practice, a wireless network may further include any additional elements suitable to support communication between UEs or between a UE and another communication device, such as a landline telephone, a service provider, or any other network node or end device. Of the illustrated components, network node 1460 and UE (WD) 1410 are depicted with additional detail. The wireless network may provide communication and other types of services to one or more UEs to facilitate the UEs' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or UE functionality, such as providing wireless connections in a wireless network. In different embodiments, the wireless network may comprise any number of wired or wireless networks, network nodes, base stations, controllers, UEs, relay stations, and/or any other components or systems that may facilitate or participate in the communication of data and/or signals whether via wired or wireless connections.

As used herein, network node refers to equipment capable, configured, arranged and/or operable to communicate directly or indirectly with a UE and/or with other network nodes or equipment in the wireless network to enable and/or provide wireless access to the UE and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a UE with access to the wireless network or to provide some service to a UE that has accessed the wireless network.

In FIG. 10, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a UE, another network node and/or any other network equipment. Similarly, antenna 1462, interface 1490, and/or processing circuitry 1470 may be configured to perform any transmitting operations described herein as being performed by a network node. Any information, data and/or signals may be transmitted to a UE, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 10 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, UE (WD) refers to a device capable, configured, arranged and/or operable to communicate wirelessly with network nodes and/or other UEs. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, UE 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 11:
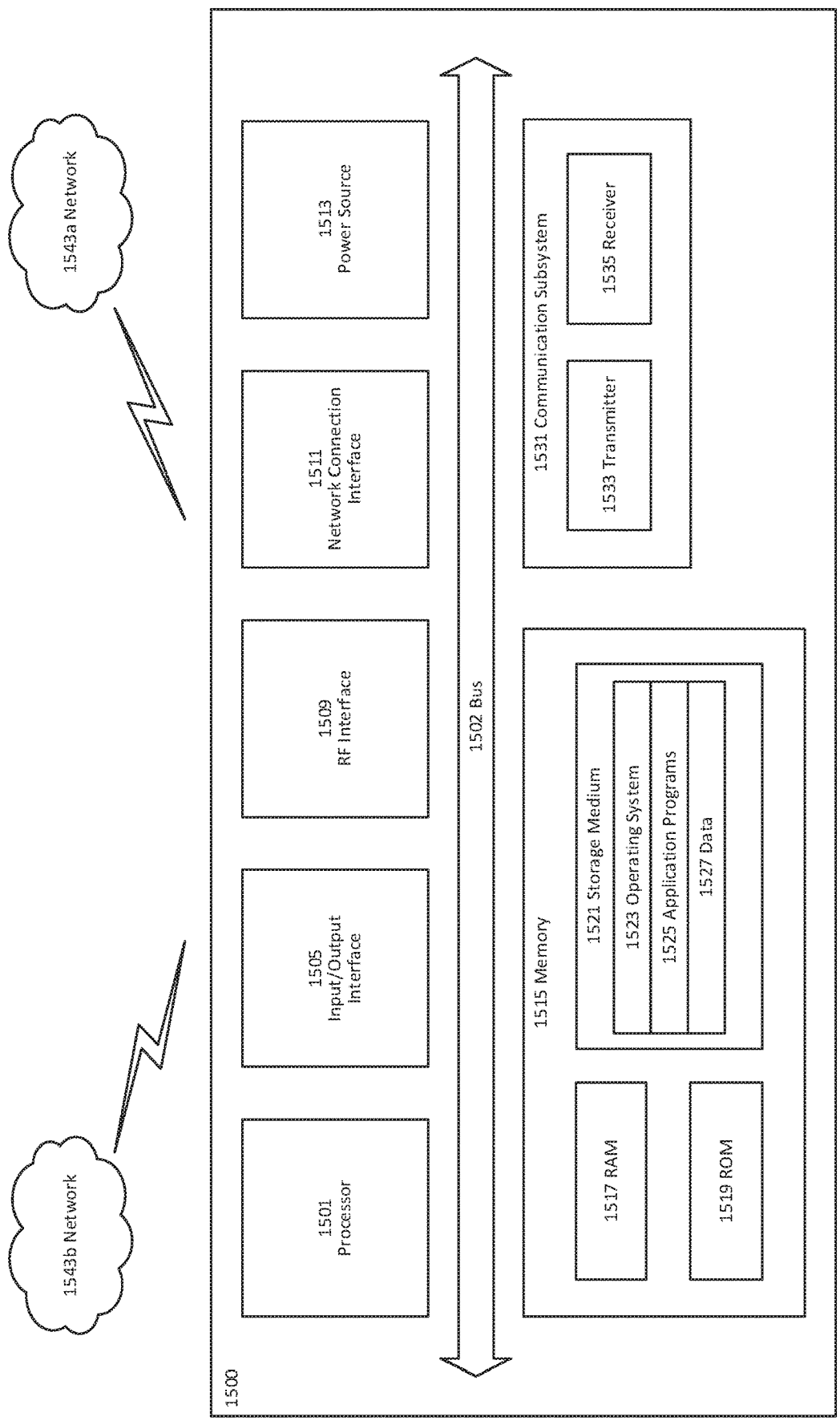
FIG. 11 is a schematic block diagram illustrating an example user equipment (UE), according to one or more embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a W-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 11, processing circuitry 1501 may be configured to communicate with network 1543b using communication subsystem 1531. Network 1543a and network 1543b may be the same network or networks or different network or networks. Communication subsystem 1531 may be configured to include one or more transceivers used to communicate with network 1543b. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543b may encompass wired and/or wireless networks such as a local-area network (LAN), a wide-area network (WAN), a computer network, a wireless network, a telecommunications network, another like network or any combination thereof. For example, network 1543b may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 12:
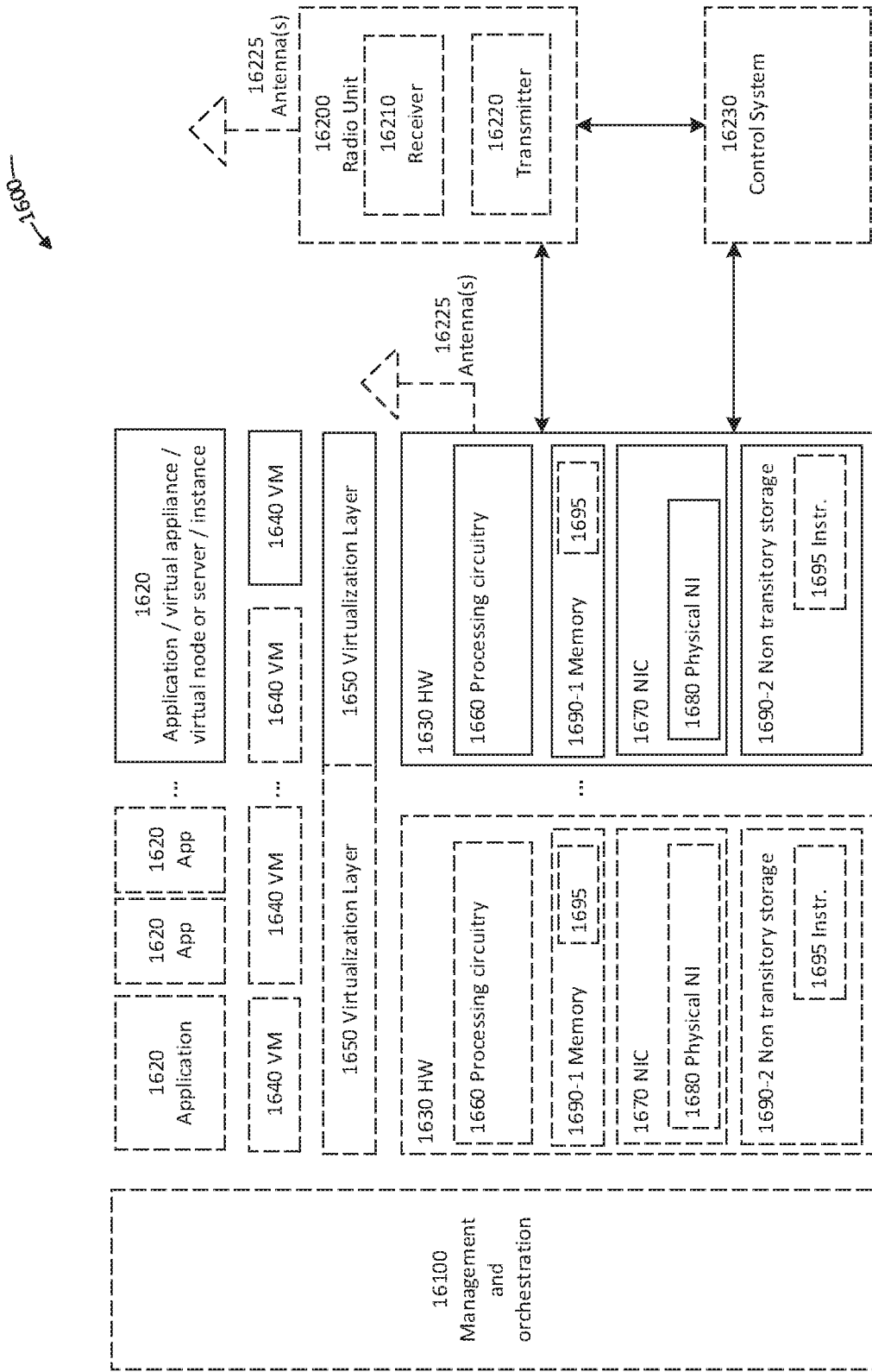
FIG. 12 is a schematic block diagram illustrating an example of a virtualization environment, according to one or more embodiments of the present disclosure.

FIG. 12 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a UE or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 12, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 12.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 13:
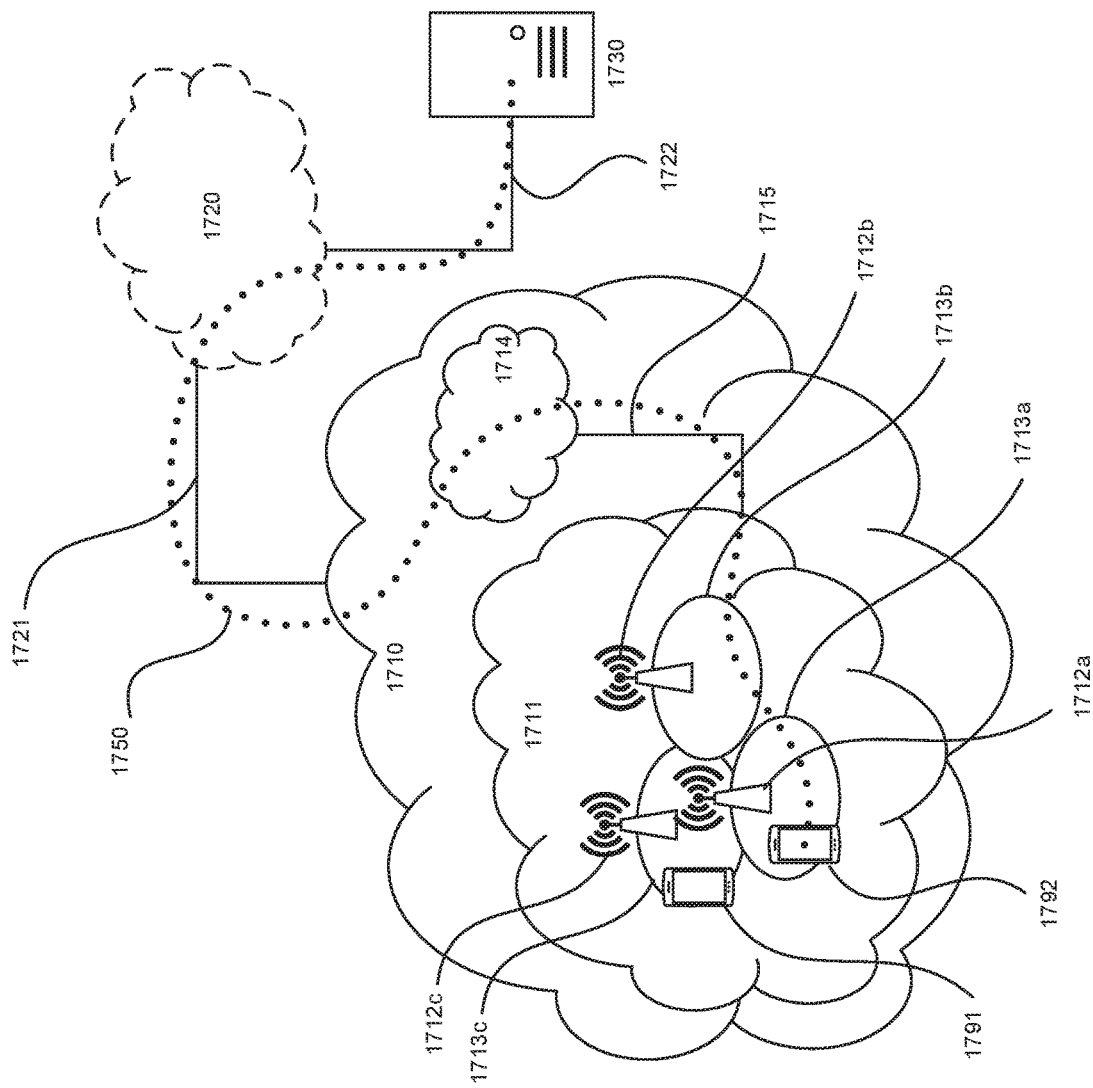
FIG. 13 is a schematic illustrating an example telecommunication network, according to one or more embodiments of the present disclosure.

FIG. 13 illustrates a telecommunication network connected via an intermediate network to a host computer in accordance with some embodiments. In particular, with reference to FIG. 13, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 13 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 14:
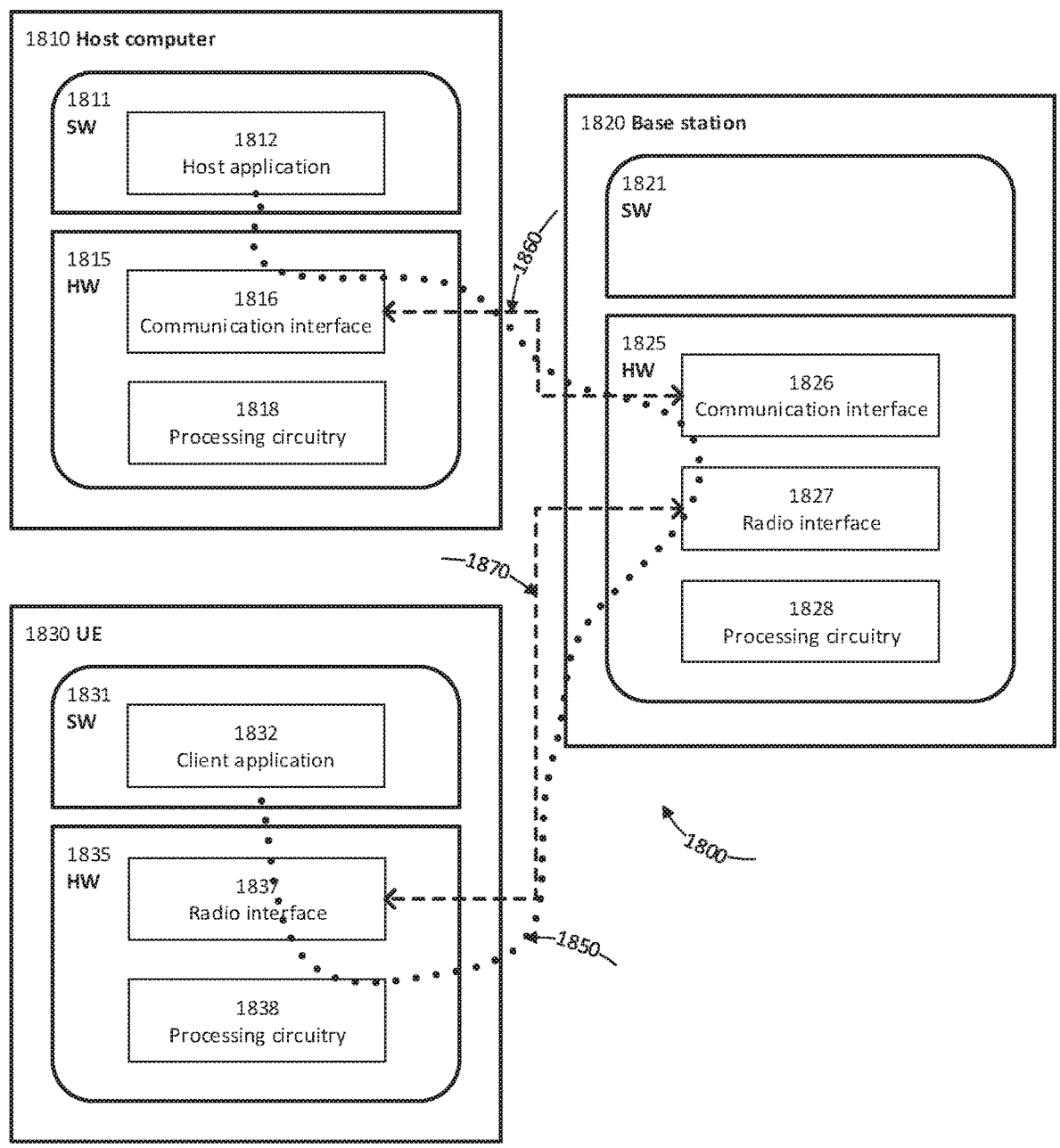
FIG. 14 is a schematic block diagram illustrating an example communication system, according to one or more embodiments of the present disclosure.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions.

Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 14) served by base station 1820. Communication interface 1826 may be configured to facilitate connection 1860 to host computer 1810. Connection 1860 may be direct or it may pass through a core network (not shown in FIG. 14) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 14 may be similar or identical to host computer 1730, one of base stations 1712a, 1712b, 1712c and one of UEs 1791, 1792 of FIG. 13, respectively. This is to say, the inner workings of these entities may be as shown in FIG. 14 and independently, the surrounding network topology may be that of FIG. 13.

In FIG. 14, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may improve the power efficiency and overhead of the system as a whole and thereby provide benefits such as overall system economy, resource and power utilization, and communication speed.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 15:
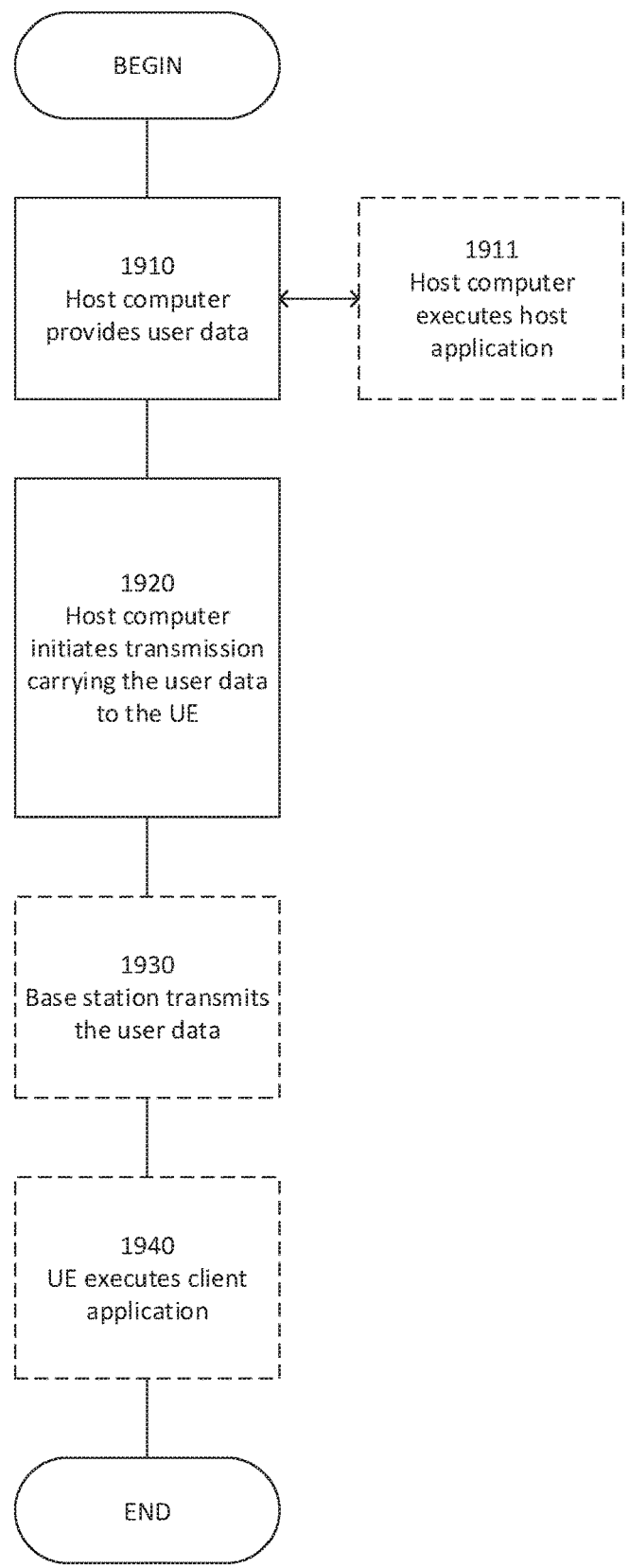
FIGS. 15-18 are flow diagrams, each of which illustrates an example method, according to particular embodiments of the present disclosure.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 16:
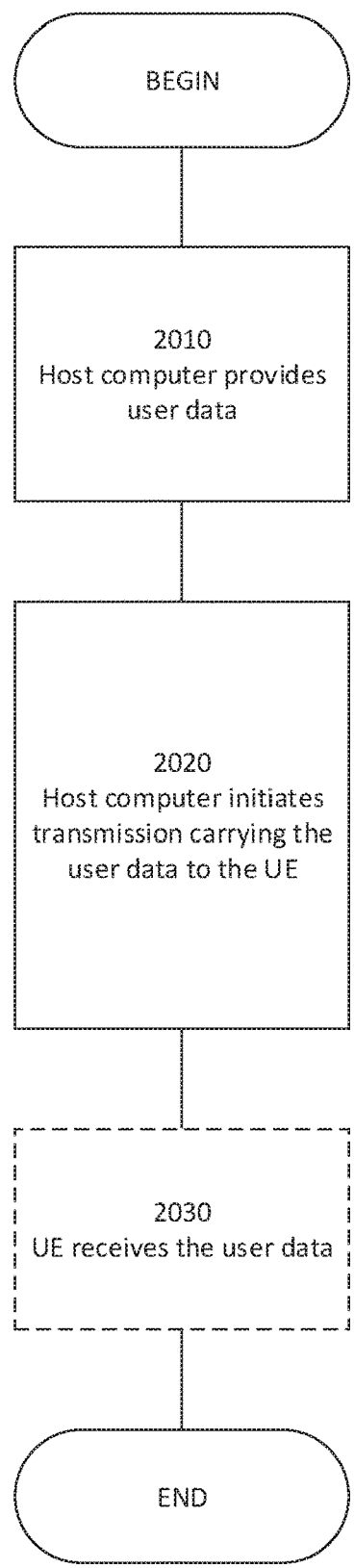

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 17:
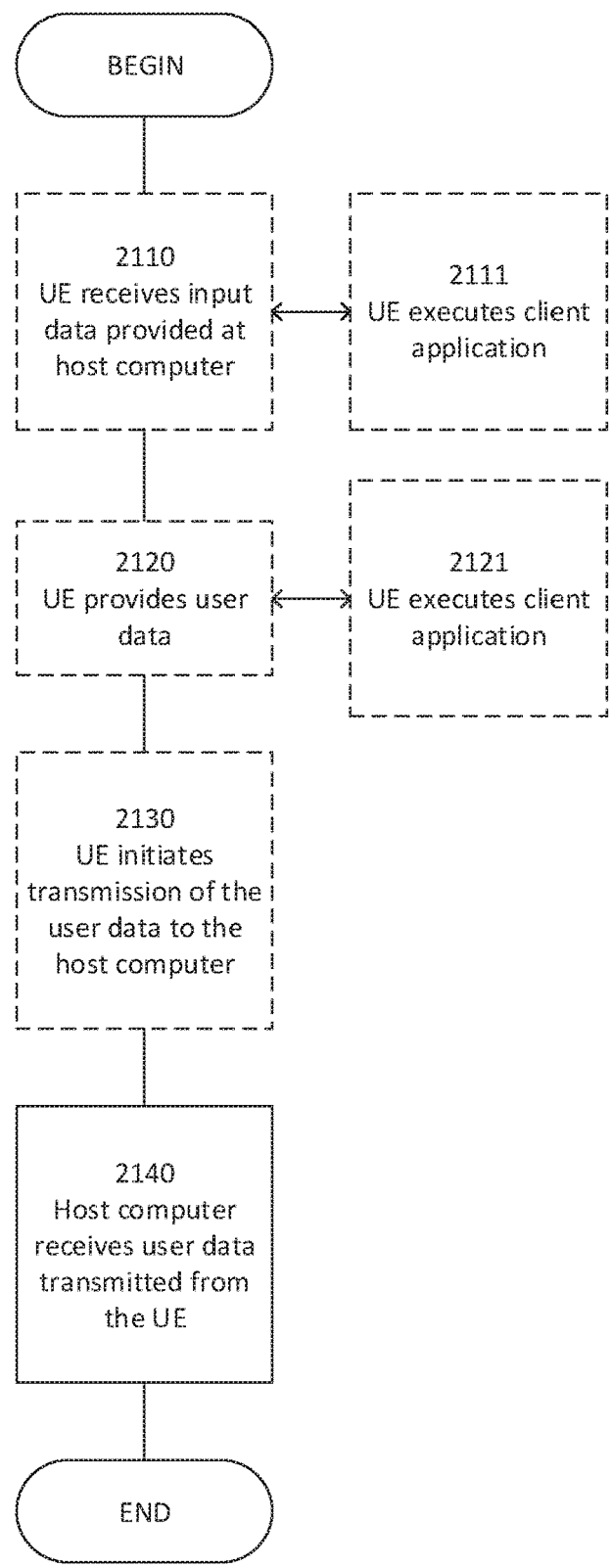

FIG. 17 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 17 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 18:
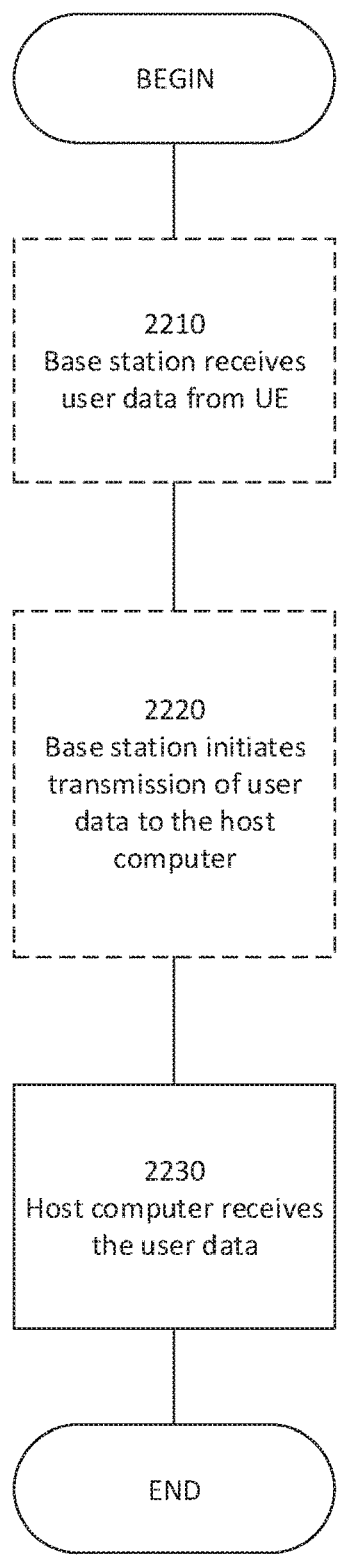

FIG. 18 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 18 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method, performed by a user equipment, the method comprising:
    monitoring a Single Cell Multicast Control Channel (SC-MCCH) for a scheduling configuration;
    receiving the scheduling configuration, over the SC-MCCH, that indicates whether one of a single transport block and multiple transport blocks of a Single Cell Multicast Traffic Channel are scheduled;
    in response to receiving the scheduling configuration, suspending the monitoring until all of the scheduled transport blocks are received;
    resuming the monitoring in response to receiving all of the scheduled transport blocks; and
    failing to receive a further scheduling configuration within a threshold period after the monitoring is resumed, and in response, re-suspending the monitoring until a preconfigured number of additional transport blocks are received, irrespective of how many transport blocks are indicated by the scheduling configuration as being scheduled.

2. The method of claim 1, wherein, to indicate that multiple transport blocks are scheduled, the scheduling configuration comprises a value explicitly specifying how many transport blocks are comprised in the multiple transport blocks.

3. The method of claim 1, wherein the scheduling configuration does not explicitly specify how many transport blocks are scheduled, and the method further comprises interpreting the scheduling configuration as indicating that the preconfigured number of transport blocks are scheduled.

4. The method of claim 1, further comprising failing to receive a further scheduling configuration within a threshold period after the monitoring is resumed, and in response, re-suspending the monitoring until additional transport blocks equal to the scheduled transport blocks in number are received.

5. The method of claim 1, wherein:
    receiving the scheduling configuration comprises receiving the scheduling configuration during a modification period of a plurality of successive modification periods; and
    the method further comprises refraining from adopting the scheduling configuration until the modification period has elapsed and the next successive modification period after the modification period has commenced.

6. The method of claim 1, wherein the scheduling configuration further indicates a change to a semi-persistent scheduling configuration of the SC-MTCH.

7. The method of claim 6, wherein the change to the SPS configuration comprises activation of SPS.

8. A user equipment comprising:
    a processor and a memory, the memory containing instructions executable by the processor whereby the UE is configured to:
        monitor a Single Cell Multicast Control Channel (SC-MCCH) for a scheduling configuration;
        receive the scheduling configuration, over the SC-MCCH, that indicates whether one of a single transport block and multiple transport blocks of a Single Cell Multicast Traffic Channel are scheduled;
        in response to receiving the scheduling configuration, suspend the monitoring until all of the scheduled transport blocks are received;
        resume the monitoring in response to receiving all of the scheduled transport blocks; and
        fail to receive a further scheduling configuration within a threshold period after the monitoring is resumed, and in response, re-suspend the monitoring until a preconfigured number of additional transport blocks are received, irrespective of how many transport blocks are indicated by the scheduling configuration as being scheduled.

* * * * *